Patented Feb. 22, 1949

2,462,635

UNITED STATES PATENT OFFICE 2,462,635

CYCLIC POLYMERIC ORGANOAMINO-SILANES

Charles P. Haber, Schenectady, N. Y., assignor to General Electric Company, a corporation of New York No Drawing. Application October 22, 1946, Serial No. 704,987

3 Claims. (Cl. 260—448.2)

This application is a continuation-in-part of my copending application Serial No. 543,211, filed July 1, 1944, and assigned to the assignee of the present invention.

This invention relates to organoaminosilanes and particularly to cyclic polymeric compositions corresponding to the general formula $[(CH_3)_2SiNH]_n$ where $n$ is one of the following: 3,4, or stated alternatively $n$ is a whole number equal to not more than 4 nor less than 3.

The claimed cyclic polymeric compositions are particularly useful in rendering materials water-repellent which are ordinarily water-non-repellent. The use of these materials for inducing water-repellency is more specifically disclosed and claimed in my aforementioned application.

The organoaminosilanes embraced by the above-mentioned general formula may be prepared by several methods. One method comprises adding a mixture comprising essentially a dimethyl dihalogenosilane to anhydrous ammonia. It will, of course, be understood that mixtures of methyl halogenosilanes containing substantial amounts of the dimethyl dihalogenosilane may also be employed in the reaction with the anhydrous ammonia to prepare my claimed compositions.

The organoaminosilanes formed by reacting a dimethyl dihalogenosilane with ammonia under anhydrous or substantially anhydrous conditions are believed to comprise a complex mixture of silyl amines, and straight chain and cyclic silazanes containing

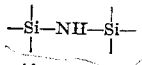

linkages. The reactions leading to the formation of these products may be represented generically by the following equations covering a possible reaction between a diorganodihalogenosilane (diorgano-silicon dihalide), for example, a dimethyl dihalogenosilane, and ammonia:

I. $R_2SiCl_2 + 4NH_3 \longrightarrow R_2Si(NH_2)_2 + 2NH_4Cl$

II. $R_2SiCl_2 + R_2Si(NH_2)_2 + 2NH_3 \longrightarrow$
$NH_2R_2Si-NH-SiR_2-NH-SiR_2NH_2 + 2NH_4Cl$ etc. In the above formulas R may be a hydrocarbon radical, more specifically, the methyl radical. The organopolysilazanes obtained above are believed to cyclicize by splitting out a molecule of ammonia to give a cyclic silazane (secondary amines) characterized by the presence of a plurality of

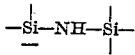

groups where two of the valencies of each silicon atom are each connected to a hydrocarbon radical, for example, the methyl radical, and the remaining valencies are satisfied by nitrogens. By fractional distillation, the cyclic polymeric compositions embraced by my claimed invention may be separated from the reaction mixture and from each other.

As is shown by the equations given hereinbefore, the reactions between the organohalogenosilane, more specifically, a methyl halogenosilane, e. g., dimethyl dichlorosilane, and ammonia are believed to comprise a step-wise conversion of the halide to the silylamine and the condensation of silylamine to form linear or cyclic silazanes. When sufficient ammonia is used to react with all the halogenosilanes (silicon halides), the products will consist substantially of mixed organoaminosilanes. When lesser amounts of ammonia are used the products will include partially reacted organohalogenosilanes containing both Si-halide and Si-amine linkages, i. e., compounds such as:

where R is an organic radical, more particularly the methyl radical, and X is a halogen, for example, chlorine, bromine, etc.

The following example illustrates the manner in which the cyclic polymeric compositions embraced by my claimed invention may be prepared. All parts are by weight.

*Example 1*

Under substantially anhydrous conditions, 140 parts dimethyl dichlorosilane containing a few per cent methyl trichlorosilane was slowly added to 500 parts by volume of liquid ammonia contained in a glass cooled by a dry ice-acetone mixture. After all the chlorosilanes had been added, the excess ammonia was allowed to evaporate and the reacting products comprising principally methyl polysilazanes were extracted with benzene from the precipitated ammonium chloride. Water-non-repellent bodies treated with the resultant clean water-white liquid mixture of methyl silicon amines were rendered water-repellent. The extracted products were also fractionally distilled to yield two compositions comprising the trimer of dimethylsilazane and the tetramer of dimethylsilazane, the former boiling at 188° C. at 756 mm. pressure and the latter boiling at 225° C. at the same pressure.

Example 2

Approximately 903 parts dimethyl dichlorosilane was dissolved in about 3080 parts of substantially anhydrous benzene in a large 3-necked glass receptacle equipped with a mechanical stirrer, water-cooled condenser and an inlet tube. Dry ammonia vapor was passed over the surface of the agitated solution which was held below 30° C. by external cooling. After about four hours, the precipitated ammonium chloride prevented further stirring. The precipitate was removed and the filtrate was treated in the same manner with ammonia in a similar glass receptacle with the exception that the mixture was heated at the reflux temperature of the mass for two hours while the ammonia was being passed in. At the end of this time, the precipitated ammonium chloride was removed by filtration and the filtrate comprising crude silazanes was fractionally distilled to yield two compositions, hexamethylcyclotrisilazane and octamethylcyclotetrasilazane, which had the following physical properties in addition to the boiling points reported in Example 1:

| Dimethylsilazane Compound | Melting Point | Refractive Index $D^{20}$ | Density $D_4^{20}$ |
|---|---|---|---|
| | °C. | | |
| [(CH$_3$)$_2$SiNH]$_3$ (Trimer)[1] | 10 | 1.4448 | 0.9196 |
| [(CH$_3$)$_2$SiNH]$_4$ (Tetramer)[2] | 97 | | |

[1] The formula for hexamethylcyclotrisilazane is

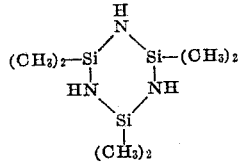

[2] The formula for octamethylcyclotetrasilazane is

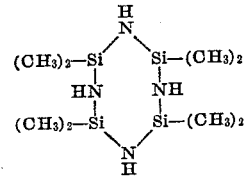

The ratio of the cyclic polymeric materials obtained by direct treatment of the methylchlorosilanes with ammonia (as in Example 1) was of the order of 60 per cent trimer, 35 per cent tetramer, and 5 per cent higher polymeric silazanes. Similar ratios are obtained by effecting reaction in the presence of solvents.

Analysis of the above two cyclic polymers for nitrogen contents revealed the presence of 19.08 per cent nitrogen in the trimer and 18.98 per cent nitrogen in the tetramer. The theoretical value for nitrogen in the repeating structural unit

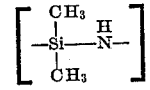

is 19.16 per cent, proving that the cyclic trimer and tetramer were obtained in the respective cases.

It will be apparent to those skilled in the art that trimeric and tetrameric ethylpolysilazanes (hexaethylcyclotrisilazane and octaethylcyclotetrasilazane) may also be prepared in a manner analogous to that employed in the above example with the exception that diethyl dichlorosilane is employed in place of the dimethyl dichlorosilane used in the above example.

What I claim as new and desire to secure by Letters Patent of the United States is:

1. Cyclic polymeric compositions corresponding to the general formula [(CH$_3$)$_2$SiNH]$_n$ where $n$ is a whole number not more than 4 nor less than 3.
2. Cyclic polymeric composition having the formula [(CH$_3$)$_2$SiNH]$_3$.
3. Cyclic polymeric composition having the formula [(CH$_3$)$_2$SiNH]$_4$.

CHARLES P. HABER.

REFERENCES CITED

The following references are of record in the file of this patent:

UNITED STATES PATENTS

| Number | Name | Date |
|---|---|---|
| 2,306,222 | Patnode | Nov. 16, 1940 |

OTHER REFERENCES

Stock, "Berichte Deut. Chem. Ges.," vol. 56 (1923), page 989.

Rochow, "Introduction to Chemistry of Silicones" (1946), page 34, Wiley & Sons, publishers. (Copy in Div. 31.)